United States Patent Office 2,974,303
Patented Mar. 7, 1961

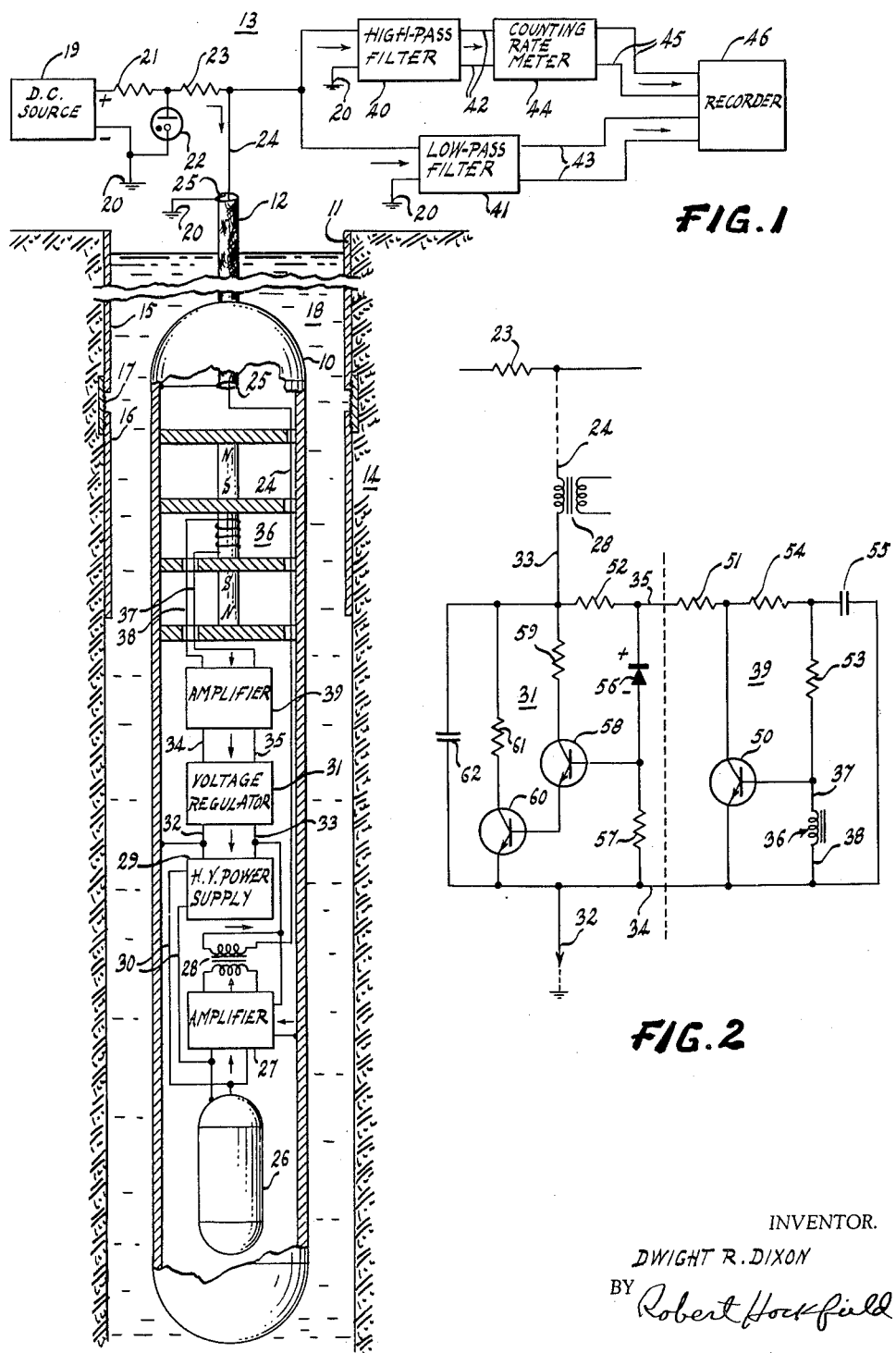

---

2,974,303

ELECTRICAL SYSTEMS FOR BOREHOLE APPARATUS

Dwight R. Dixon, Bellaire, Tex., assignor, by mesne assignments, to Schlumberger Well Surveying Corporation, Houston, Tex., a corporation of Texas Filed Feb. 8, 1957, Ser. No. 639,007

9 Claims. (Cl. 340—18)

This invention relates to electrical systems and, more particularly, pertains to a new and improved energizing and signal-translating system for apparatus adapted to be passed through a borehole.

To control the operation of and/or energize various devices in borehole apparatus and to convey information signals from the apparatus to surface equipment, usually a supporting cable having a plurality of electrical conductors is employed, thus providing a number of distinct communication circuits. It is often desirable to utilize each such communication circuit for more than one purpose, either to decrease the number of cable conductors required or to afford additional information channels in an existing cable of a given number of conductors.

Various arrangements have been proposed for the foregoing purpose, such as time-sharing, frequency selection, phantoming, or the like; however, these may be deficient in being undesirably complex or too unreliable under the physical conditions normally imposed on borehole apparatus.

It is therefore an object of the present invention to provide a new and improved electrical system that is relatively simple to construct and yet is entirely efficient and reliable in operation.

Another object of the present invention is to provide a new and improved electrical system wherein energy is transmitted over a conductor in the form of a unidirectional current and information is returned as an undulating current.

A further object of the present invention is to provide a new and improved electrical system for energizing a device or devices in borehole apparatus and for translating signals from the borehole apparatus to surface equipment.

An electrical system in accordance with the present invention comprises an energizing circuit including at least one conductor extending between first and second locations. Means coupled to the conductor at the first location and to a reference point is provided for supplying a unidirectional current over the conductor. A load circuit is coupled to the conductor at the second location and to a reference point for utilizing the unidirectional current and a regulator is also coupled to the conductor at the second location and to a reference point for minimizing voltage fluctuations at the conductor. The regulator includes a control circuit to which information signals are supplied to effect current variations in the conductor responsive to the signals. The system further comprises means coupled to the conductor at the first location and to a reference point and responsive to current variations in the conductor for obtaining indications responsive to the signals.

The novel features of the present invention are set forth with particularity in the appended claims. The present invention, both as to its organization and manner of operation, together with further objects and advantages thereof, may best be understood by reference to the following description taken in connection with the accompanying drawing in which:

Fig. 1 is a schematic diagram, partly in block form, of an electrical system embodying the present invention shown in association with borehole apparatus; and Fig. 2 is a schematic circuit diagram of a portion of the system illustrated in Fig. 1.

Although the invention may be used in any of a variety of applications wherein a unidirectional potential is supplied over a monocable and one or two information signals are returned over the same cable, it will be described in the particular environment of an arrangement including a casing collar locator and a radiant energy detector carried by a support adapted to be passed through a borehole drilled into the earth.

Thus, as shown in Fig. 1 of the drawing, a fluid-tight, metal housing 10 is supported in a borehole 11 by an armored cable 12 which, together with a winch (not shown), may be employed for lowering and raising housing or support 10 in the borehole. As will be described hereinafter, power from surface equipment 13 is supplied over the cable 12 to apparatus within the housing 10 while signals from the housing are translated over the cable to the surface equipment 13.

Borehole 11 traverses a plurality of earth formations 14 and may be provided with a casing including a string of sections, such as sections 15 and 16 joined together by a threaded coupling 17. The borehole may be dry or it may be filled with a drilling mud 18, as shown.

To supply electrical power for energizing a device within housing 10, a source 19 of direct current in surface equipment 13 has one terminal grounded at reference point 20 and its remaining terminal connected by a series resistor 21 to one of the electrodes of a conventional glow-type regulator tube 22 whose other electrode is grounded at 20. Accordingly, a source of unidirectional potential of essentially fixed magnitude is provided. One terminal of the source is connected by a resistive impedance 23 to insulated conductor 24 of cable 12 whose shield 25 is connected to ground 20.

Supported at the lower end of housing 10 is a radiant energy detector 26, such as a conventional Geiger tube, connected to the input circuit of an amplifier 27. By means of connections between shield 25 of cable 12 and housing 10 and a circuit from lead 24 to amplifier 27, unidirectional current from the source is utilized to energize the amplifier which thus constitutes a load circuit. The output circuit of the amplifier is coupled to the primary winding of a transformer 28 whose secondary is connected in series circuit relation with lead 24. Accordingly, a pulse-type signal having frequency components in a relatively high frequency range is supplied over the conductor 24. Usually this range extends from several tens to several thousands of cycles per second.

A high voltage power supply 29 supplied with the D.C. available between conductor 24 and housing 10 develops a high voltage at leads 30 necessary for energizing counter tube 26. Supply 29 may be of any conventional construction; for example, it may be comprised of a suitable oscillator for deriving an alternating potential that is applied to a step-up transformer, the output of which is rectified and filtered.

To stabilize the voltage at conductor 24 for variations resulting from changes in the current drain of amplifier 27 with the rate of occurrence of pulses translated thereby, a voltage regulator 31 is provided within housing 10. One of its terminals 32 is grounded to the housing and another terminal 33 is connected to conductor 24 via the secondary of transformer 28. Regulator 31 may be of conventional construction or may be of the specific type to be described hereinafter in connection with Fig. 2. As will be evident from the discussion to follow, regulator 31 constitutes an adjustable resistance responsive to the voltage at terminals 32 and 33 to vary the resistance value thereof inversely with voltage and includes a control circuit having terminals 34 and 35. The alternating current impedance at terminals 32 and 33 is relatively low for signal components in the aforementioned high frequency range so that one terminal of the secondary of transformer 28 is effectively grounded to housing 10 for such signals.

Supported at the upper end of housing 10 is a casing collar locator unit 36 which may be constructed in a known manner; for example, the casing collar locator may be of the type disclosed in Patent 2,558,427, as shown. A magnetic circuit is provided so that when the locator 36 passes one of the casing joints, such as the one designated 17, a pulse appears at its leads 37, 38 which are connected to the input circuit of an amplifier 39. Amplifier 39 may be appropriately energized by connections (not shown) to lead 24 and housing 10 and its output circuit is connected to terminals 34 and 35 of regulator 31. Accordingly, the system embodying the present invention is provided with another source of information signals carried by the support 10 and coupled to the control circuit of the regulator to effect current variations in conductor 24 responsive to these signals. This source provides pulse-type signals of relatively low frequency compared to the frequency components in the signal developed at radiant energy detector 26. For the usual speeds at which support 10 is passed through borehole 11, the components developed by locator 36 are in a range from one to ten cycles per second.

At the surface of the earth, conductor 24 is connected to an input terminal of a high-pass filter 40 and to an input terminal of a low-pass filter 41, the remaining input terminals of which are grounded at 20. Thus, one output signal is derived at leads 42 from filter 40 responsive to high frequency components, while another output signal is derived at leads 43 from filter 41 responsive to frequency components in the lower of the frequency ranges.

Leads 42 are connected to a conventional counting rate meter 44 which develops at its output leads 45 a potential having a magnitude dependent upon the rate of occurrence of the pulses applied to the meter. The pairs of leads 43 and leads 45 are connected to a recorder 46 in which the recording medium is displaced in proportion to movement of housing 10 through the borehole 11. Thus, individual traces may be derived representing the signals from radiant energy detector 26 and casing collar locator 36, respectively, plotted as a function of depth in the borehole 11.

In operation, as housing 10 is passed through borehole 11, the flux of radiant energy incident on the detector 26 results in the production of a pulse-type signal which after amplification in amplifier 27 is supplied over conductor 24 to the surface of the earth. Since the frequency components of this signal are in a relatively high range, substantially none of this signal is passed by a low-pass filter 41, while all components in this range are passed by high-pass filter 40 to counting rate meter 44. Thus, a voltage is supplied to recorder 46 which is a function of the flux of radiant energy incident on detector 26.

As the counting rate varies, the current drawn by amplifier 27 may vary and the rate of this variation may be such that signal components within the pass-band of filter 41 are produced. However, any change in voltage at leads 32 and 33 is compensated by regulator 31 and extraneous signal components resulting from this phenomenon are minimized at conductor 24.

Each time a casing collar, such as the one designated 17, is passed by locator 36, a signal is produced and, after amplification in amplifier 39, this signal is supplied via leads 34, 35 to the control circuit of regulator 31. As a consequence, the current flowing through conductor 24 is varied in response to the casing collar signal and a voltage is developed at resistive impedance 23 in the surface equipment. Since this signal voltage has frequency components in a relatively low range, essentially none can pass through filter 40. Substantially all components, however, are passed by filter 41 to the recorder 46.

It is thus evident that by employing an electrical system featuring the present invention, a unidirectional current may be supplied over a monocable to a load device within borehole apparatus and the cable conductor voltage is regulated against fluctuations caused by variable current drain. At the same time, the cable conductor voltage is varied according to the casing collar locator signal by supplying this signal to the control circuit of the regulator. Another signal, as provided by the radiant energy detector, which is distinguishable from the casing collar signal, is supplied over the conductor to the surface equipment. Accordingly, the utility of the cable conductor is appreciably increased although the system is relatively simple to construct and reliable in operation.

If desired, still another pulse-type signal may be supplied over cable conductor 24. For example, an additional radiant energy detector (not shown) may be supported within housing 10 and provided with an amplifier. The amplifier may be connected to the cable conductor by a transformer so that the pulses are of a polarity opposite to the polarity of the pulses supplied to the conductor via transformer 28. Thus, after separation by high-pass filter 40, suitable biased-amplifiers may be provided to separate the positive from the negative pulses for application to independent counting rate meters.

With either system as shown or the modified arrangement, the housing 10 may also carry a source of radiant energy, such as a conventional mixture of radium and beryllium providing neutrons for irradiating formations 14. In the latter case, the detector 26 may be responsive to either neutrons slowed by the formations and/or gamma rays resulting from such irradiating, while the additional detector may be responsive to gamma radiation naturally emanating from the formations.

An example of a regulator which may be used as element 31 is illustrated in Fig. 2 where elements whose counterparts are shown in Fig. 1 are represented by the same reference numerals. As seen in Fig. 2, amplifier 39 may be comprised of a junction transistor 50 having casing collar locator 36 in circuit with its base electrode. The emitter electrode of this transistor is connected to leads 34 and 32 and is thus grounded, while the collector electrode is connected via a collector resistor 51 and lead 35 to the regulator 31 wherein a connection to lead 33 is completed via a resistor 52. The junction of a lead from locator 36 and the base of transistor 50 is connected via series resistors 53 and 54 to the collector electrode of transistor 50 thereby to provide a bias for the base electrode, and a by-pass condenser 55 is connected between the junction of resistors 53 and 54 and lead 38.

In regulator 31 the junction between lead 35 and resistor 52 is connected to a constant-voltage device which may be either a glow-type regulator or a suitable diode 56, as shown. Element 56 may be of the type commonly referred to as a "Zener" diode having an operating characteristic such that the voltage drop across it remains essentially constant over a given operating range of currents. The remaining terminal of the diode 56 is connected by a resistor 57 to lead 32 and the junction between the diode and this resistor is connected to the base of a junction transistor 58.

The collector electrode of transistor 58 is connected via a collector resistor 59 to lead 33 and its emitter electrode is connected to the base electrode of another junction transistor 60 whose emitter electrode is connected to lead 32 and whose collector electrode is connected via a collector load resistor 61 to lead 33. A by-pass condenser 62 connected between leads 32 and 33 has a capacitance value presenting a relatively low impedance for signal components, in the relatively high range of frequences, as provided by radiant energy detector 26.

It will be seen that resistor 23 (in the surface equipment 13 shown in Fig. 1) together with transistors 58 and 60 and diode 56 constitute a shunt voltage regulator which, in the absence of a signal at locator 36, maintains the voltage between leads 32 and 33 at a substantially constant value. This voltage is approximately equal to the breakdown voltage of diode 56. Variations in current drawn by amplifier 27 are absorbed in the regulator, and the current drawn from the source 19—22 at the surface of the earth is essentially constant.

Signal currents from casing collar locator 36 are amplified by transistor 50 and fed through resistor 52 which is in series with the voltage-determining diode 56. This varies the voltage which appears between lead 33 and the base electrode of transistor 58. The regulator causes the voltage of cable conductor 24 developed at resistor 23 to vary relative to shield 25 by approximately the same amount.

In a practical embodiment of the arrangement shown in Figs. 1 and 2, the following components were employed:

| | |
|---|---|
| Source 19 | 475 volts. |
| Resistor 21 | 8,000 ohms. |
| Resistor 23 | 3,500 ohms. |
| Glow tube 22 | Type OA2. |
| Transistor 50 | Type 904. |
| Transistors 58 and 60 | Type 952. |
| Resistors 51, 53, 54 | 40,000 ohms. |
| Resistor 52 | 2,000 ohms. |
| Resistors 59, 61 | 6,000 ohms. |
| Condenser 55 | 40 microfarads. |
| Condenser 62 | 2 microfarads. |
| Potential between terminals 33 and 32 | 60 volts. |

The foregoing data is presented purely by way of illustration and is not to be considered in any way as limiting the scope of the invention.

Of course, any other form of regulator, whether utilizing electron tubes, transistors or other types of control devices, may be appropriately employed. Moreover, the electrical system embodying the present invention may be employed in association with signal sources of other types.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

I claim:

1. An electrical system for borehole apparatus comprising: a support adapted to be passed through a borehole; an energizing circuit including at least one conductor extending from the surface of the earth to said support; means coupled to said conductor at the surface of the earth and to a reference point for supplying a unidirectional current over said conductor; a load circuit carried by said support and coupled to said conductor and to a reference point for utilizing said unidirectional current; a voltage regulator circuit carried by said support and including an adjustable impedance circuit coupled to said conductor and to a reference point for providing an alternative path for said unidirectional current, circuit means for providing a reference voltage, and adjusting circuit means responsive to the conductor voltage and to the reference voltage for adjusting the impedance circuit for minimizing voltage fluctuations at the lower end of said conductor; a source of information-bearing signals carried by said support and coupled to said adjusting circuit means to effect current variations in said conductor corresponding to said signals; and means coupled to said conductor at the surface of the earth and responsive to current variations in said conductor for obtaining indications representative of said signals.

2. An electrical system for borehole apparatus comprising: a support adapted to be passed through a borehole; an energizing circuit including at least one conductor extending from the surface of the earth to said support; means coupled to said conductor at the surface of the earth and to a reference point for supplying a unidirectional current over said conductor; a load circuit carried by said support and coupled to said conductor and to a reference point for utilizing said unidirectional current; a voltage regulator circuit carried by said support and including an adjustable impedance circuit coupled to said conductor and to a reference point for providing an alternative path for said unidirectional current, circuit means for providing a reference voltage, and adjusting circuit means responsive to the conductor voltage and to the reference voltage for adjusting the impedance circuit for minimizing voltage fluctuations at the lower end of said conductor; a source of information-bearing signals having components in one frequency range carried by said support and coupled to said adjusting circuit means to effect current variations in said conductor corresponding to said signals; another source of information-bearing signals having components in another frequency range carried by said support and coupled to said conductor and to a reference point; means coupled to said conductor at the surface of the earth and to a reference point for deriving two output signals representative of frequency components in respective ones of said frequency ranges; and means for obtaining indications of each of said output signals.

3. An electrical system for borehole apparatus comprising: a support adapted to be passed through a borehole; an energizing circuit including at least one conductor extending from the surface of the earth to said support; means coupled to said conductor at the surface of the earth and to a reference point for supplying a unidirectional current over said conductor; a load circuit carried by said support and coupled to said conductor and to a reference point for utilizing said unidirectional current; a voltage regulator circuit carried by said support and including an adjustable impedance circuit coupled to said conductor and to a reference point for providing an alternative path for said unidirectional current, circuit means for providing a reference voltage, and adjusting circuit means responsive to the conductor voltage and to the reference voltage for adjusting the impedance circuit for minimizing voltage fluctuations at the lower end of said conductor; a source of information-bearing signals having components in a relatively low frequency range carried by said support and coupled to said adjusting circuit means to effect current variations in said conductor corresponding to said signals; another source of information-bearing signals having components in a relatively high frequency range carried by said support and coupled to said conductor and to a reference point; high-pass and low-pass filters coupled to said conductor at the surface of the earth and to a reference point for deriving two output signals representative of frequency components in respective ones of said frequency ranges; and means for obtaining indications responsive to each of said output signals.

4. An electrical system for borehole apparatus comprising: a support adapted to be passed through a borehole; an energizing circuit including at least one conductor extending from the surface of the earth to said support; means coupled to said conductor at the surface of the earth and to a reference point for supplying a unidirectional current over said conductor; a load circuit carried by said support and coupled to said conductor and to a reference point for utilizing said unidirectional current; a voltage regulator circuit carried by said support and including an adjustable impedance circuit coupled to said conductor and to a reference point for providing an alternative path for said unidirectional current, circuit means for providing a reference voltage, and adjusting circuit means responsive to the conductor voltage and to the reference voltage for adjusting the impedance circuit for minimizing voltage fluctuations at the lower end of said conductor; a casing collar locator carried by said support and providing one signal corresponding to variations in ferromagnetic characteristics of a medium surrounding the borehole apparatus and coupled to said adjusting circuit means for effecting current variations in said conductor corresponding to such signal; a radiant energy detector carried by said support, coupled to said conductor and to a reference point and providing another signal corresponding to incident radiant energy; and indicating means coupled to said conductor at the surface of the earth and to a reference point for providing indications of each of said signals.

5. An electrical system for borehole apparatus comprising: a support adapted to be passed through a borehole; an energizing circuit including at least one conductor extending from the surface of the earth to said support; circuit means located at the surface of the earth for providing a substantially constant unidirectional voltage between a pair of output terminals, one of which is connected to a reference point; an electrical resistance connecting the other of said output terminals to the upper end of said conductor for supplying a unidirectional current over said conductor; a load circuit carried by said support and coupled to said conductor and to a reference point for utilizing said unidirectional current; an adjustable resistance circuit carried by said support and coupled to said conductor and to a reference point for providing an alternative path for said unidirectional current; circuit means carried by said support for providing a reference voltage; adjusting circuit means carried by said support and responsive to the conductor voltage and to the reference voltage for adjusting the resistance circuit for minimizing voltage fluctuations at the lower end of said conductor; a source of information-bearing signals carried by the support and coupled to said adjusting circuit means to effect current variations in said conductor corresponding to said signals; and means coupled to said conductor at the surface of the earth and to a reference point and responsive to current variations in the conductor for obtaining indications representative of said signals.

6. An electrical system for borehole apparatus comprising: a support adapted to be passed through a borehole; an energizing circuit including at least one conductor extending from the surface of the earth to said support; circuit means located at the surface of the earth for providing a substantially constant unidirectional voltage between a pair of output terminals, one of which is connected to a reference point; an electrical resistance connecting the other of said output terminals to the upper end of said conductor for supplying a unidirectional current over said conductor; a load circuit carried by said support and coupled to said conductor and to a reference point for utilizing said unidirectional current; an adjustable resistance device carried by said support and including a control electrode and a pair of current flow electrodes coupled to said conductor and to a reference point for providing an alternative path for said unidirectional current; circuit means carried by said support and including a fixed resistor and a voltage regulator device connected in series between said conductor and a reference point for providing a reference voltage; circuit means carried by said support and responsive to the conductor voltage and to the reference voltage for supplying a control signal to said control electrode for varying the resistance value of said resistance device inversely with the voltage at the lower end of said conductor for minimizing voltage fluctuations thereat; a source of information-bearing signals carried by said support and coupled to said control electrode to effect current variations in said conductor corresponding to said signals; and means coupled to said conductor at the surface of the earth and to a reference point and responsive to current variations in the conductor for obtaining indications representative of said signals.

7. In an electrical system for borehole apparatus including a downhole load circuit and a downhole signal source both adapted to be coupled to surface equipment via means including at least one conductor coupled at the surface of the earth to a source of unidirectional current which serves to energize the downhole load circuit, the combination comprising: a voltage regulator circuit included in the downhole apparatus and including an adjustable impedance circuit coupled to the lower end of the conductor and to a reference point for providing an alternative path for said unidirectional current, circuit means for providing a reference voltage, and circuit means responsive to the voltage at the lower end of said conductor and to the reference voltage for adjusting the impedance circuit for minimizing voltage fluctuations at the lower end of the conductor; said adjusting circuit means also being coupled to the downhole signal source thereby to effect current variations in the conductor corresponding to signals from such signal source; and means coupled to the conductor at the surface of the earth and responsive to current variations in the conductor for obtaining indications representative of said signals.

8. An electrical system for borehole apparatus comprising: a support adapted to be passed through a borehole; an energizing circuit including at least one conductor extending from the surface of the earth to said support; means coupled to said conductor at the surface of the earth and to a reference point for supplying a unidirectional current over said conductor; a signal-translating circuit carried by said support and coupled to said conductor and to a reference point for energization by said unidirectional current, said signal-translating circuit having an output circuit coupled to said conductor and to a reference point and having an input circuit; a voltage regulator circuit carried by said support and including an adjustable impedance circuit coupled to said conductor and to a reference point for providing an alternative path for said unidirectional current, circuit means for providing a reference voltage, and control circuit means responsive to the conductor voltage and to the reference voltage for adjusting the impedance circuit for minimizing voltage fluctuations at the lower end of said conductor; two sources of distinguishable information signals carried by said support and coupled to said control circuit means and to said input circuit, respectively; and means coupled to said conductor at the surface of the earth and to a reference point for obtaining indications representative of each of said signals.

9. In an electrical system for borehole apparatus, the combination comprising: downhole apparatus adapted to be moved through the borehole and including sensing means, electrical operating circuits, and a power supply system therefor for investigating the subsurface environment; an electrical conductor extending from the surface of the earth to the downhole apparatus and having its downhole end coupled to the power supply system; power supply means located at the surface of the earth and coupled to the upper end of the conductor for sending power supply current down the conductor for energizing the downhole power supply system; circuit means located with the downhole apparatus and coupled to the lower end of the conductor for substantially eliminating extraneous fluctuations in the power supply current coming down the conductor; circuit means located with the downhole apparatus and coupled to the lower end of the conductor for deliberately varying the power supply current coming down the conductor in accordance with a signal generated by the sensing means; and means located at the surface of the earth and coupled to the upper end of the conductor for providing indications of the deliberate variations in the power supply current.

References Cited in the file of this patent

UNITED STATES PATENTS

| | | |
|---|---|---|
| 2,379,996 | Silverman | July 10, 1945 |
| 2,412,575 | Frosch | Dec. 17, 1946 |
| 2,554,844 | Swift | May 29, 1951 |
| 2,573,137 | Greer | Oct. 30, 1951 |
| 2,752,508 | Zito | June 26, 1956 |
| 2,816,235 | Scherbatskoy | Dec. 10, 1957 |